Patented Oct. 23, 1951

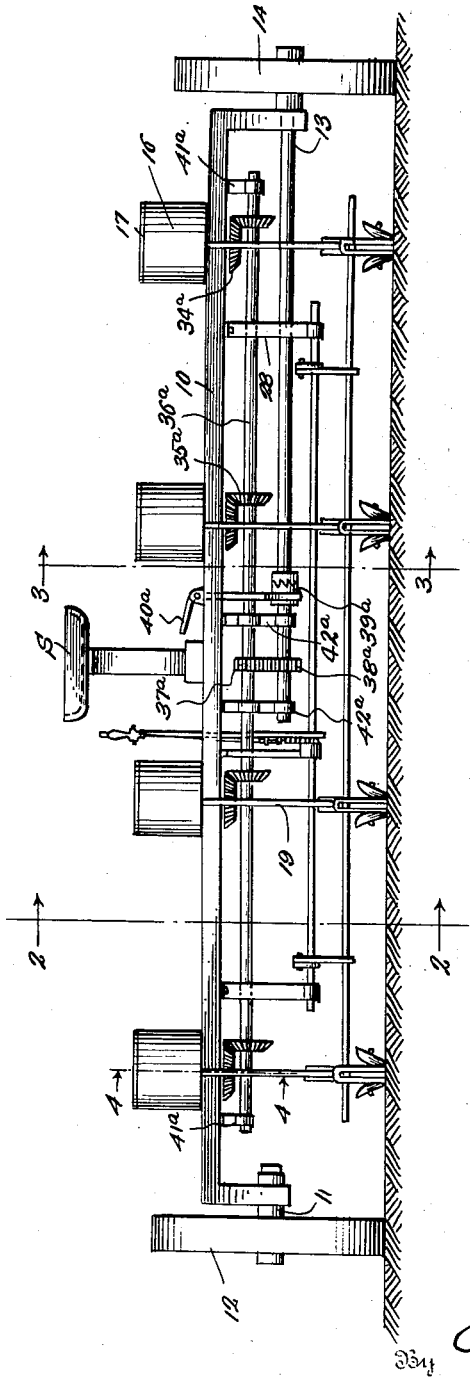
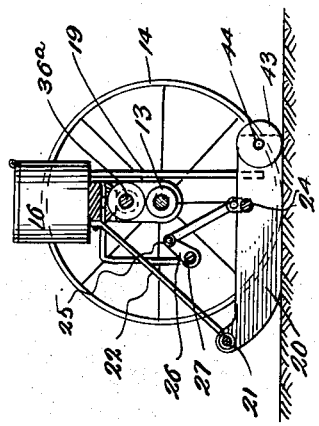
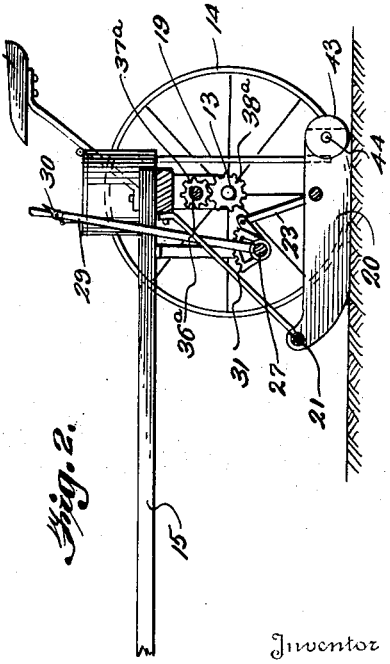

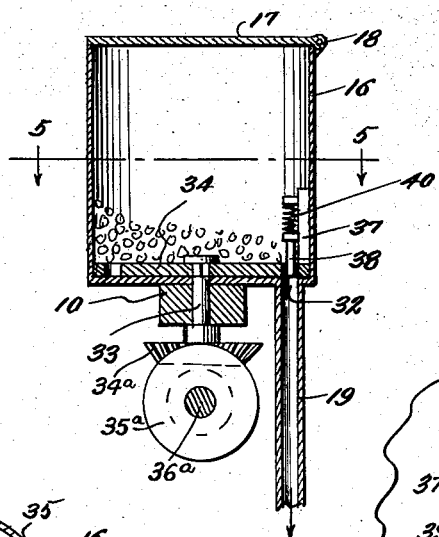
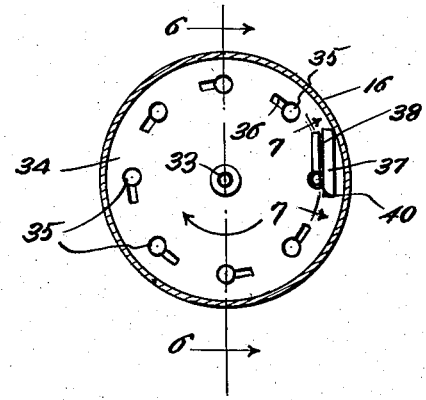
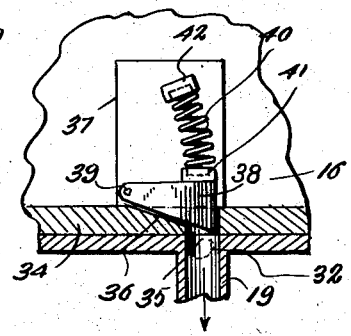
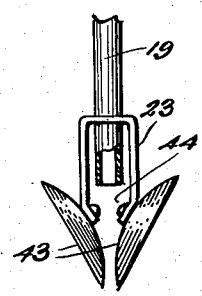
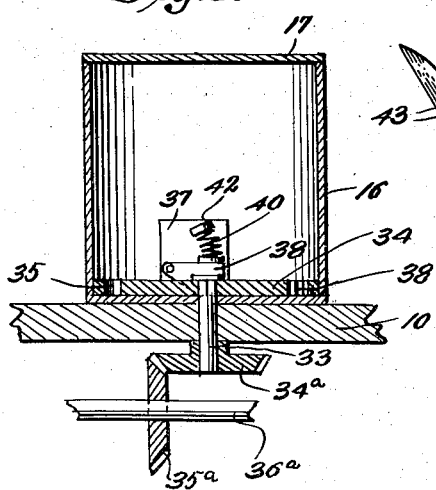

2,572,060

UNITED STATES PATENT OFFICE 2,572,060

SEED DISPENSER WITH PIVOTED EJECTOR

Jerome A. Schwabenlender, Milwaukee, Wis.

Application May 2, 1945, Serial No. 591,469

1 Claim. (Cl. 222—222)

This invention relates to a planter especially adapted for the planting of beet seeds, the machine being intended for planting seed singly and spaced apart equidistantly.

It is specially aimed to provide a construction which will eliminate the necessity of thinning beets and the consequent expense, both as regards the use of a thinning machine and the subsequent manual thinning.

It is further aimed to provide a structure wherein one seed at a time is dropped and positively discharged, which is especially desirable in view of the light weight of the seeds.

Further, an object is to provide a structure wherein the seeding mechanism is operable through the ground wheel of the machine, including rotary dispensing mechanism and also including planting shoe means adjustable as to depth of operation.

The more specific objects and advantages will become apparent from a consideration of the description following, taken in connection with the accompanying drawings illustrating an operative embodiment.

In said drawings:

Figure 1 is a view of the planter primarily in rear elevation;

Figure 2 is a vertical section taken on the plane of line 2—2 of Figure 1;

Figure 3 is a vertical section taken on the plane of line 3—3 of Figure 1;

Figure 4 is a vertical section on an enlarged scale taken on the line 4—4 of Figure 1;

Figure 5 is a horizontal section taken on the line 5—5 of Figure 4;

Figure 6 is a vertical section taken on the line 6—6 of Figure 5;

Figure 7 is a vertical section taken on the line 7—7 of Figure 5;

Figure 8 is a view similar to Figure 7 but showing the seed ejector in raised position;

Figure 9 is a fragmentary view primarily in rear elevation, and partly in section, showing a seed discharge chute, shoe and covering means on an enlarged scale.

Referring specifically to the drawings, wherein like reference characters designate like or similar parts throughout the different views, 10 represents a suitable frame having a fixed axle 11 at one end on which a wheel 12 is journaled and having a rotatable axle or shaft 13 journaled on the frame at the other end and to which a ground wheel 14 is keyed or otherwise fixed. This frame may be drawn by any suitable power through the means of a bar or pole at 15.

Along the frame 10 a suitable number of receptacles or hoppers 16 are disposed having suitable closures 17 pivoted thereon as at 18 or otherwise mounted. The hoppers are adapted to hold any desired quantity of seed, such as beet seed or any other kind which the machine is capable of dispensing.

Seed dispensing tubes 19 depend from the bottoms of the hoppers 16 into planting shoes 20, such shoes being conventional, longitudinally disposed and of inverted U-shape in plan at their open ends at the rear. Shoes 20 are pivoted on horizontal axes at 21 on brackets 22 extending angularly and downwardly from the frame 10. In addition, links 23 are pivoted at 24 to the shoes 20 and at 25 to cranks 26 keyed to and extending from a transversely disposed rocker shaft 27 journaled in suitable bearings 28 depending from the frame 10. Shaft 27 may be rocked in order to raise and lower the links 23 to regulate the depth of operation of the shoes 20, through the lever 29 rigid on the shaft 27 and which may be latched or secured in its adjusted position by conventional means 30 to a shoe segment 31 associated with one of the bearings 28.

Each hopper 16 has a discharge opening or port 32 aligned with the discharge tube 19 extending therefrom. Vertical stub shafts 33 are journaled on the frame 10 and extend into the hoppers 16 and have valve plates 34 secured thereto to rotate therewith. Such plates rest on the bottom wall of the hoppers 16 and they may have any suitable number of openings 35 therein each of a size to collect a single seed, the seed preferably being sifted or otherwise regulated so that all seeds in each hopper will be of the same size and approximately of a dimension the same as the height or thickness of the valve disks 34. Thus, as the openings 35 register with the openings 32, they will respectively discharge their seed as suggested in Figure 7. It will be noted that slots 36 having inclined bottom walls leading from the openings 35 and trail the same in the direction of rotation. A block 37 or the like is suitably fastened within each hopper 16 and a seed ejector 38 is pivoted thereto at 39 and such ejector is urged downwardly by an expansive coil spring 40 seated in cups 41 and 42, respectively mounted on the ejector 38 and on the block 37. Thus as the plates 34 rotate in the direction of rotation suggested by the arrow in Figure 5, the ejector 38 will, under the action of spring 40, snap into the openings and slots 36 and eject a seed, as suggested in Figure 7, thereafter moving out of the openings and slots 36, following the valve plate 34, and repeating the action thereafter in the succeeeding openings and slots.

Said stub shafts 33 have beveled gear wheels 34a keyed thereto which are enmeshed with bevel gear wheels 35a keyed to an operating shaft 36a. Shaft 36a in turn is provided with a spur gear wheel at 37a enmeshed with a spur gear wheel 38a. The shaft 13 is in sections, one of which has the gear wheel 38a keyed thereto and which sections are adapted to be coupled and uncoupled through the actuation of a conventional clutch at 39a controlled by shifter mechanism 40a mounted on the frame 10. Said shaft 36a is journaled in bearings 41a and 42a. Bearings 42a are extended so that one section of the shaft 13 is also journaled therein.

As a result of the construction described, the seed will be planted or dispensed through the actuation of the ground wheel 14. Attention is called to the fact that as the machine moves along, and following the deposit of seed through the discharge tube 19, the furrow will be closed through the action of inclined covering disks 43, paired as shown and pivoted as at 44 to the shoes.

I prefer to manufacture the machine as a four-row planter, as shown, but it is to be understood that I may make it in the two-row size or otherwise.

Various changes may be resorted to provided they fall within the spirit and scope of the invention.

I claim as my invention:

A planting mechanism comprising a hopper having a substantially flat bottom provided with a discharge opening, a substantially flat valve disk rotatably disposed on and substantially covering said bottom, means for rotating the valve disk, said valve disk having a seed opening arranged to move into and out of registry with the discharge opening when the valve disk is revolved, an elongated spring pressed ejector pivotally mounted adjacent one of its ends in said hopper having a free end disposed to enter the seed opening when said openings are in registry for positively ejecting the seed from the openings and outwardly of the hopper, said ejector having an inclined bottom edge extending between its pivoted end and its free end forming a cam surface extending from the free end to adjacent the pivoted end of the ejector and defining a sharp corner at the bottom edge of said free end disposed to ride on the upper surface of the valve disk and off of the leading edge of the seed opening to release the ejector to be forcibly swung into the bottom of the seed opening, and said valve disk having an inclined cam surface extending from the bottom of the seed opening in a direction opposite to the direction of rotation of the valve disk for engagement with the cam surface of the ejector for camming the ejector upwardly and out of the seed opening and into a raised, retracted position as the seed opening moves out of registry with the discharge opening.

JEROME A. SCHWABENLENDER.

REFERENCES CITED

The following references are of record in the file of this patent:

UNITED STATES PATENTS

| Number | Name | Date |
|---|---|---|
| 343,286 | White et al. | June 8, 1886 |
| 367,781 | Broady | Aug. 9, 1887 |
| 534,361 | Courtney | Feb. 19, 1895 |
| 665,047 | Armitage | Jan. 1, 1901 |
| 752,661 | Dyer | Feb. 23, 1904 |
| 821,070 | Weaver | May 22, 1906 |
| 835,066 | Hampton | Nov. 6, 1906 |
| 1,073,816 | Parker et al. | Sept. 23, 1913 |
| 1,241,123 | Johnson | Sept. 25, 1917 |
| 1,903,836 | Ray | Apr. 18, 1933 |